(12) United States Patent
Ishikawa et al.

(10) Patent No.: US 7,982,926 B2
(45) Date of Patent: Jul. 19, 2011

(54) IMAGE READING APPARATUS

(75) Inventors: Tetsurou Ishikawa, Tokyo (JP); Tatsuya Nishi, Narashino (JP); Kazuhide Sugiyama, Yokohama (JP)

(73) Assignee: Canon Denshi Kabushiki Kaisha, Saitama-ken (JP)

( * ) Notice: Subject to any disclaimer, the term of this patent is extended or adjusted under 35 U.S.C. 154(b) by 439 days.

(21) Appl. No.: 12/128,451

(22) Filed: May 28, 2008

(65) Prior Publication Data

US 2008/0297857 A1    Dec. 4, 2008

(30) Foreign Application Priority Data

May 29, 2007    (JP) ................................. 2007/141702

(51) Int. Cl.
*H04N 1/04*    (2006.01)
(52) U.S. Cl. ........ 358/496; 358/498; 358/408; 358/483; 358/482; 358/474
(58) Field of Classification Search .................. 358/496, 358/498, 401, 474, 408, 483, 482; 399/211, 399/123, 71, 343, 367, 364; 250/208.1, 234–236, 250/216, 239; 382/312, 318, 319
See application file for complete search history.

(56) References Cited

U.S. PATENT DOCUMENTS

| 2002/0101625 A1* | 8/2002 | Shouji | 358/474 |
| 2005/0152009 A1* | 7/2005 | Lee | 358/474 |
| 2005/0254103 A1 | 11/2005 | Sugiyama et al. | 358/474 |
| 2007/0223061 A1 | 9/2007 | Tanaka et al. | 358/497 |

FOREIGN PATENT DOCUMENTS

JP    2000-151913    5/2000

* cited by examiner

*Primary Examiner* — Cheukfan Lee
(74) *Attorney, Agent, or Firm* — Fitzpatrick, Cella, Harper & Scinto

(57) ABSTRACT

An image reading apparatus capable of preventing the occurrence of a streak and reading a quality image from the leading edge to the trailing edge of a original. An original is conveyed along a convey pass. The original being conveyed is guided by a guide member, at least part of the guide member being transparent. An image of the original being conveyed is read by an image sensor through the guide member. Airflow is generated, the airflow being blown into the convey pass from a location upstream in a conveying direction compared to a location of the image sensor. The guide member has a convex portion disposed at a location upstream in the conveying direction compared to the location of the image sensor.

17 Claims, 6 Drawing Sheets

IMAGE READING APPARATUS

BACKGROUND OF THE INVENTION

1. Field of the Invention

The present invention relates to an image the reading apparatus which reads an image of an original being conveyed on a convey pass, such as a copier, facsimile, or document scanner.

2. Description of the Related Art

Conventionally, an image reading apparatus includes an original feed tray on which a plurality of originals are placed, a pickup roller for taking the originals on the original feed tray into a convey pass, a feed roller that follows the pickup roller to feed the originals to the convey pass, and a retard roller paired with the feed roller to separate the fed originals one by one.

Each original fed to the convey pass is conveyed downstream by a registration roller pair and a convey roller pair, and its image is read by an image sensor while being conveyed around the image sensor. Thereafter, the original is further conveyed downstream by a convey roller pair, discharged by a discharge roller, and stacked on a stacking tray.

The image sensor includes a light source that illuminates the original, and light-receiving elements that convert reflected light from the original into electric signals. The image sensor reads the image of the original by scanning the original in synchronization with the movement of the original being conveyed on a contact glass (a guide member) of the image sensor.

At this point, foreign objects carried into the convey pass along with the original, such as paper dust originated out of the original itself and roller crumbs scraped off from the rollers conveying the original, may attach to the contact glass.

When reading a original, the image sensor is fixed at a predetermined position. Therefore, a foreign object such as dust remaining on the light path of the incident light of the image sensor will be read together with the original. The foreign object blocks the incident light of the image sensor, and a black or colored streak occurs in the read image and degrades the read image quality.

Therefore, on the occurrence of a streak in the read image, a user needs to clean the contact glass provided in the image reading apparatus and have the original read again.

To solve this problem, there has been proposed a technique for preventing foreign objects such as paper dust from frequently attaching to the contact glass by using an airflow generator provided upstream from the image sensor to send airflow to interspace between a original being conveyed and the contact glass (see Japanese Laid-Open Patent Publication (Kokai) No. 2000-151913).

In this proposal, a sensor for sensing a original is disposed at each of a paper feed position upstream from the contact glass and a paper discharge position downstream from the contact glass. Control is performed in such a manner that the driving of the airflow generator is started when the leading edge of a original is sensed at the paper discharge position, and the driving is stopped when the trailing edge of the original is sensed at the paper feed position. In this manner, flutters of the leading and trailing edges of the original caused by the airflow are prevented so as to avoid degradation in the read image.

However, with the technique of the above Japanese Laid-Open Patent Publication (Kokai) No. 2000-151913, a rigid original or a original with wrinkles, creases, etc., being conveyed tends to contact a portion of the contact glass opposed to the image sensor. This contact causes contaminants to attach to the contact glass.

Once contaminants attaches to the contact glass, the adherence increases because of the adhesion of the contaminants itself, static electricity, and so on, and airflow stronger than airflow capable of blowing off the floating contaminants is needed. This requires increasing the wind volume and wind pressure produced by the airflow generator, which will be a cause of preventing downsizing of the apparatus.

In addition, the driving of the airflow generator can not start until the leading edge of the original reaches the paper discharge position downstream from the contact glass. Therefore, during the period before the start of the driving of the airflow generator paper dust produced from the original or contaminants attached to the original cannot be prevented from attaching to the contact glass.

SUMMARY OF THE INVENTION

The present invention provides an image reading apparatus capable of preventing the occurrence of a streak and capable of reading high quality image from the leading edge to the trailing edge of a original by allowing prevention of contaminants from attaching to a guide member residing at or near a original reading position, which is a focal position on a light path for an image sensor to read the original, without being affected by the rigidity or wrinkles, creases, etc., of the original, and by allowing prevention of flutters of the leading and trailing edges of the original caused by airflow.

In an aspect of the present invention, there is provided an image reading apparatus that conveys an original along a convey pass and reads an image of the original being conveyed, comprising a guide member adapted to guide the original being conveyed, at least part of the guide member being transparent, an image reading unit adapted to read an image of the original being conveyed through the guide member, and an airflow generating unit adapted to generate airflow blown into the convey pass from a location upstream in a conveying direction compared to a location of the image reading unit, and the guide member has a convex portion disposed at a location upstream in the conveying direction compared to the location of the image reading unit.

According to the present invention, a convex portion is provided at a portion of a guide member, the portion being upstream from an image reading unit on a convey pass, and airflow generated by an airflow generating unit is flown to a reading position where the image reading unit reads an image of an original. Therefore, it is possible to prevent contaminants from attaching to a portion of the guide member around the original reading position without being affected by the rigidity or wrinkles, creases, etc., of the original, and it is possible to prevent flutters of the leading a trailing edges of the original caused by the airflow. This allows reading a streak-free quality image from the leading edge to the trailing edge of the original.

Further features and advantages of the present invention will become apparent from the following detailed description of exemplary embodiments with reference to the attached drawings.

DETAILED DESCRIPTION OF THE PREFERRED EMBODIMENTS

The present invention will now be described in detail with reference to the drawings showing preferred embodiments thereof.

Figure 1:
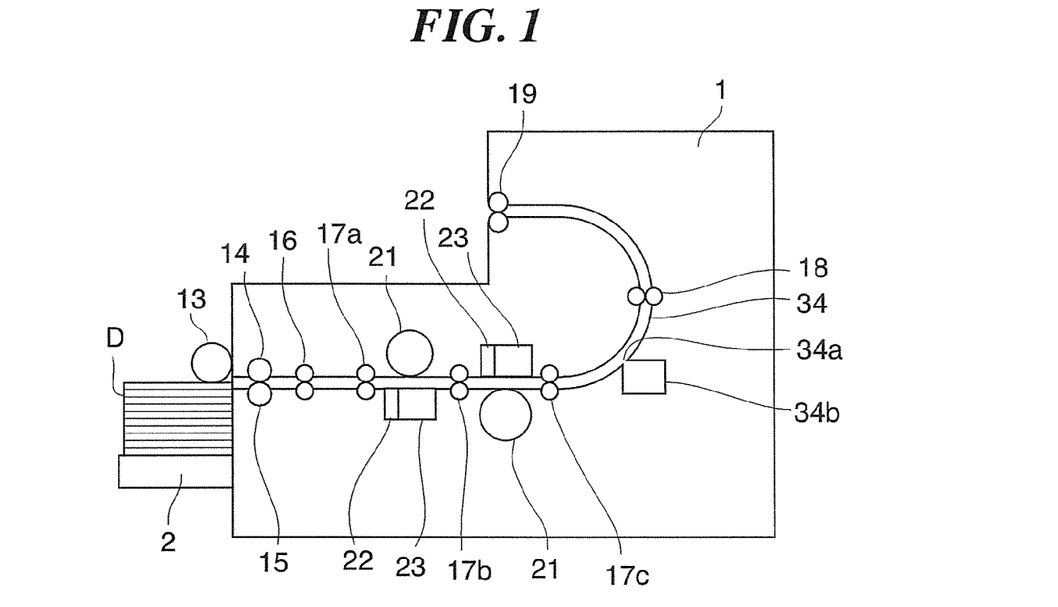
FIG. 1 is a sectional view schematically showing a configuration of an image reading apparatus according to a first embodiment of the present invention.

FIG. 1 is a sectional view schematically showing a configuration of an image reading apparatus according to a first embodiment of the present invention.

As shown in FIG. 1, the image reading apparatus 1 in this embodiment includes a original feed tray 2 on which originals D are placed, a pickup roller 13 for taking the originals D into the apparatus a feed roller 14 that feeds the originals D taken through the pickup roller 13 to a convey pass 34, a retard roller 15 paired with the feed roller 14 to separate the originals D from each other, a registration roller pair 16 that conveys each original D while correcting skew of the incoming original D, convey roller pairs 17a, 17b, 17c, and 18 that convey the original D along the convey pass 34, and a discharge roller pair 19 that discharges the original D outside the apparatus.

Scanning assemblies 23 that read an image of the original D are disposed between the convey roller pairs 17a and 17b and between the convey roller pairs 17b and 17c, respectively.

The scanning assembly 23 disposed between the convey roller pairs 17a and 17b reads an image on the back side of the original D, and the other scanning assembly 23 disposed between the convey roller pairs 17b and 17c reads an image on the front side of the original D. Two platen rollers 21 to be read together with the original D to form the background portions of the read images are disposed opposite to the scanning assemblies 23 across the convey pass 34.

The original D conveyed toward the scanning assemblies 23 is line-scanned while passing between the scanning assemblies 23 and the platen rollers 21. The read image information is converted into electric signals and output to an image processing unit (not shown).

The original D which the image thereon is read by the scanning assemblies 23 is discharged outside the apparatus via the convey roller pair 17c, the convey roller pair 18, and the discharge roller pair 19 along the convey pass.

Figure 2:
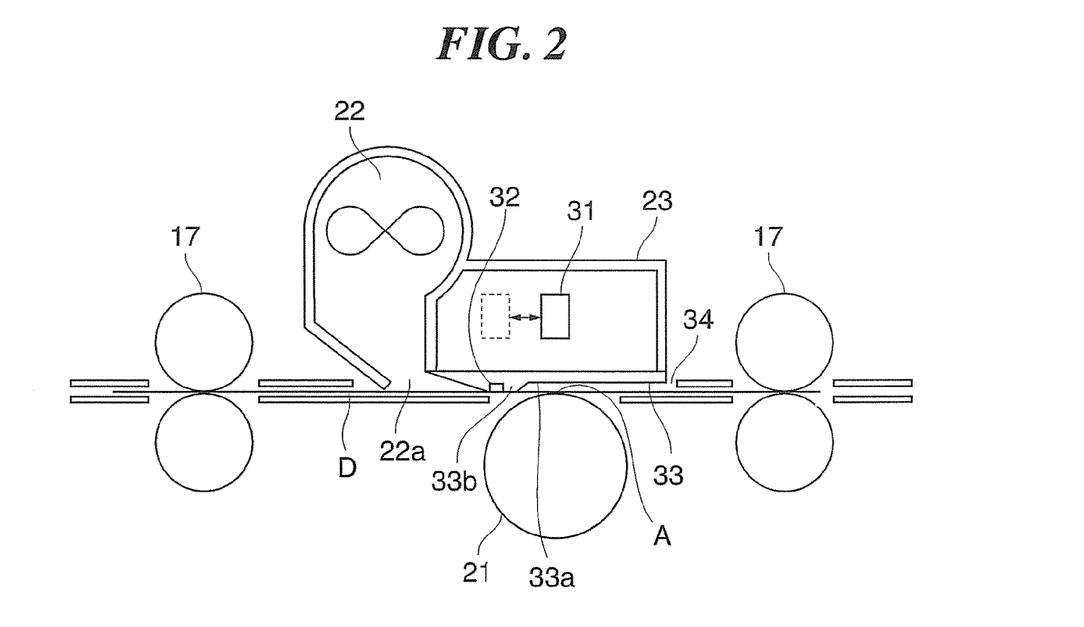
FIG. 2 is a sectional view around a scanning assembly in the image reading apparatus of FIG. 1.
Figure 3:
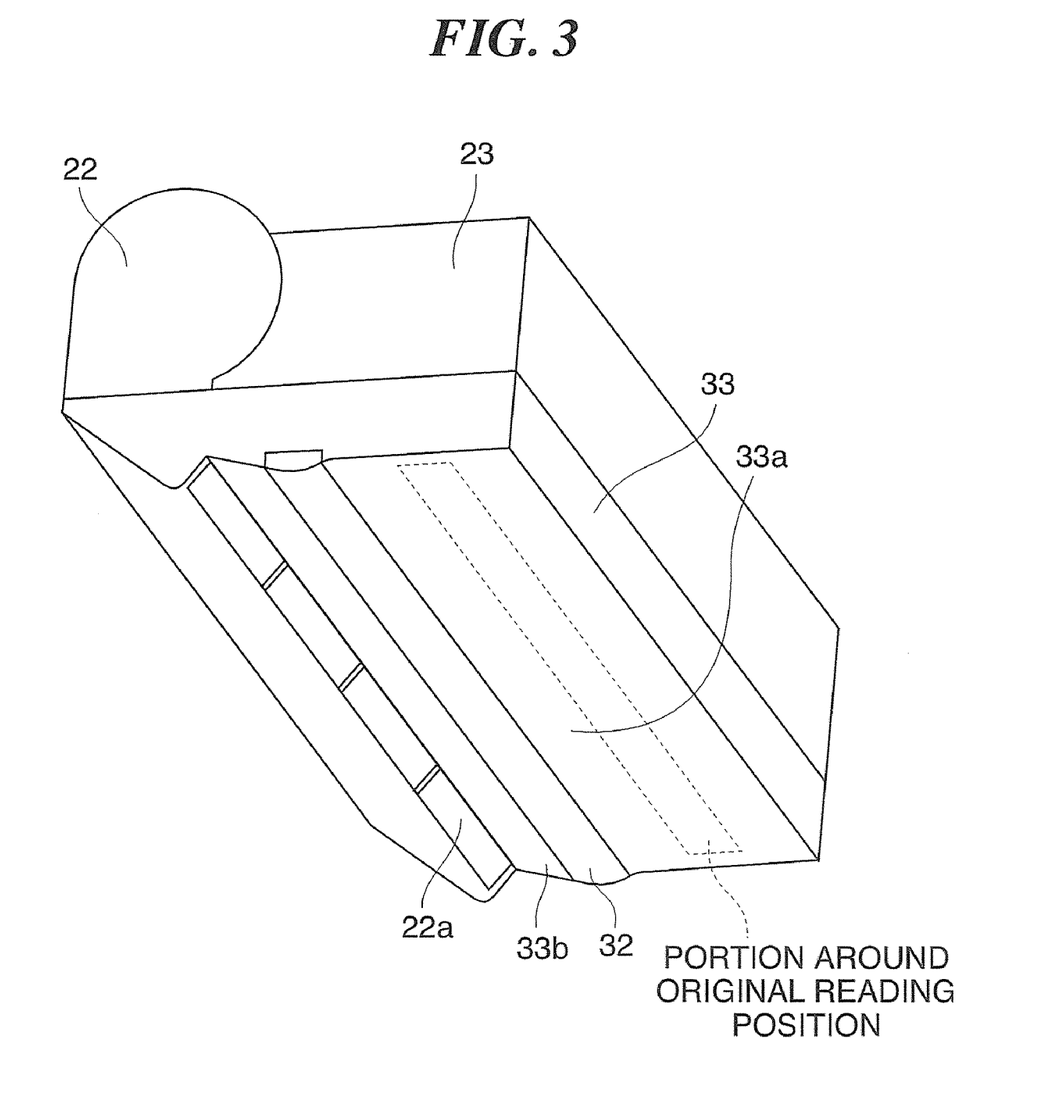
FIG. 3 is a perspective view of the scanning assembly provided with an airflow generator.
Figure 4:
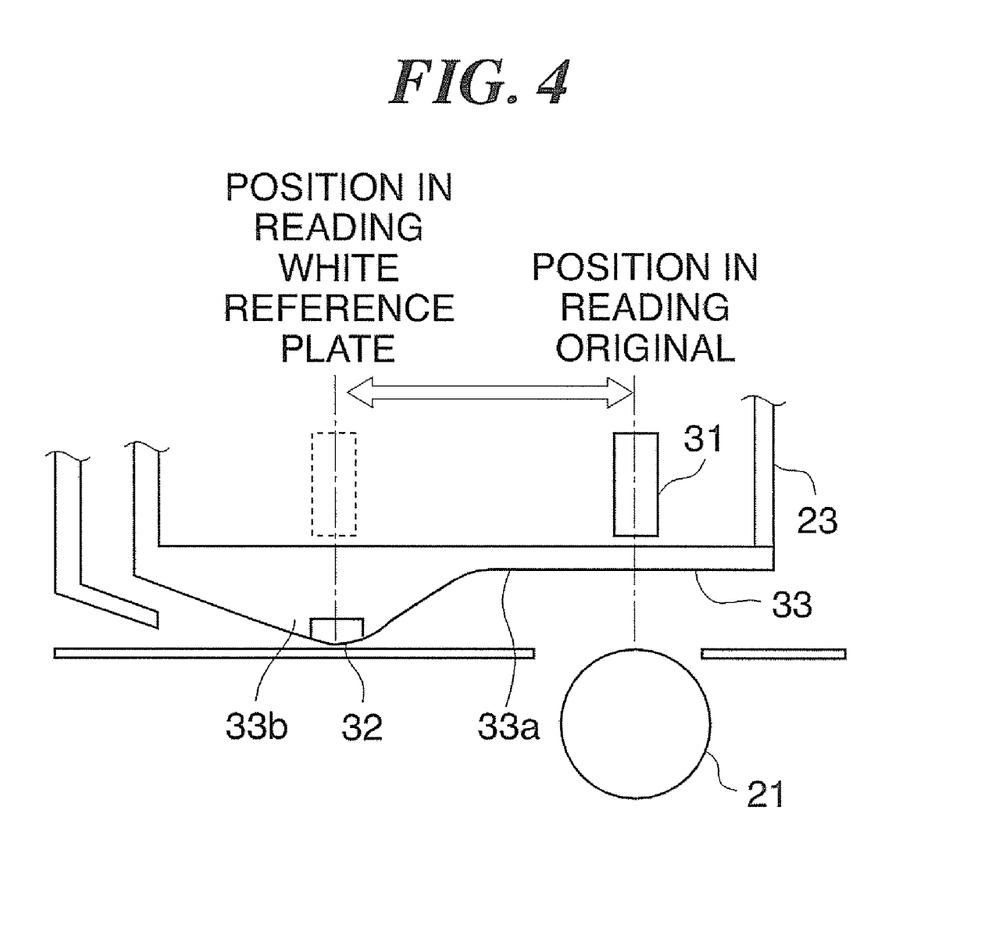
FIG. 4 is an enlarged sectional view around a guide member in FIG. 2.

FIG. 2 is a sectional view around the scanning assembly 23 in the image reading apparatus 1 of FIG. 1. FIG. 3 is a perspective view of the scanning assembly 23 provided with an airflow generator 22. FIG. 4 is an enlarged sectional view around a guide member 33 in FIG. 2.

In FIG. 2, the airflow generator 22 as an airflow generating unit is integrally provided on an upstream side (a side in the direction from which the original comes) of the scanning assembly 23. An image sensor 31 as an image reading unit is disposed in the scanning assembly 23. The guide member 33 guiding the original D conveyed on the convey pass 34 is disposed on the side of the scanning assembly 23 that faces the convey pass 34.

The airflow generator 22 has blowout openings 22a provided upstream from an original reading position A, which is a focal position on a light path for the image sensor 31 to read the image of the original D. The plural blowout openings 22a are disposed in a row in a longitudinal direction with respect to the guide member 33 (in a lateral direction with respect to the original D, i.e., in the direction substantially orthogonal to the conveying direction, in FIG. 2).

A fan or the like in the airflow generator 22 is rotationally driven to cause airflow from each blowout opening 22a toward the original reading position A along the guide member 33. This airflow is constantly generated at least while the original D is passing through the original reading position A where the image sensor reads the original D.

The airflow generator 22 need not be disposed at the position shown in FIG. 2. However, the blowout openings 22a for the airflow need to be provided at a position upstream from the original reading position A, for example, at the position shown in FIG. 2. By way of example, the image reading apparatus may be configured such that the airflow generated by the airflow generator disposed distant from the blowout openings 22a is blown from the blowout openings 22a via an air tube or the like.

The guide member 33 is formed of a transparent material and functions as a conveying guide for the original D, and also as a guide for smoothly guiding the airflow blown from the blowout openings 22a of the airflow generator 22 to around the original reading position A.

Figure 9:
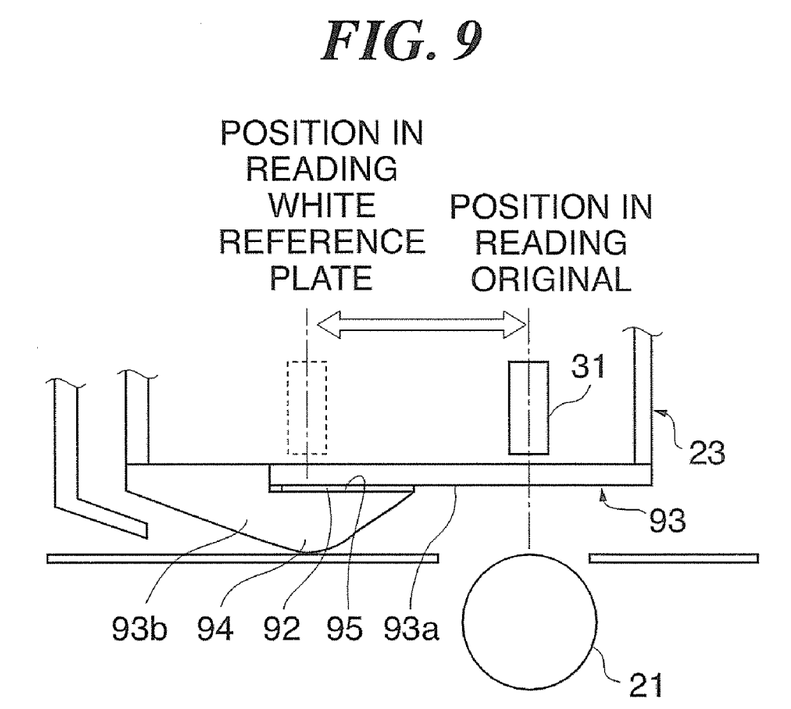
FIG. 9 is an enlarged sectional view around the guide member in the image reading apparatus according to a sixth embodiment of the present invention.

As shown in FIG. 9, at a downstream portion of the guide member 33 downstream in the conveying direction of the original D, there is formed a flat portion 33a, which is a plane substantially parallel with the convey pass 34, around the original reading position A where the image sensor 31 reads the original D.

A convex portion 33b protruding toward the convey pass 34 is formed upstream from the flat portion 33a. It is preferable that the protruding vertex of the convex portion 33b is designed to have a height so that a tangent line of the platen roller 21 extended in parallel with the convey pass 34 is substantially identical to a tangent line of the protruding vertex of the convex portion 33b.

This convex portion 33b restrains a fluttering movement of the edges of the original D immediately before the original reading position A. Therefore, flutters of the original D that tend to occur in reading of the leading and trailing edges of the original D can be suppressed.

Thus, at least while the original D is being conveyed, the airflow generator 22 can be constantly driven to constantly generate the airflow flowing from each blowout opening 22a toward the original reading position A along the guide member 33. Also, there is no need to set a period during which the airflow is reduced. For example, the airflow may be generated at any time with the maximum airflow generation capability of the airflow generator 22.

Since the convex portion 33b is steplessly coupled with the flat portion 33a, few airflow disturbances occur. In this regard, it is more preferable that the convex portion 33b is coupled with the flat portion 33a by a smoothly continuing curved surface (guide surface) in order to prevent airflow disturbances.

Thus, the airflow generated by the airflow generator 22 can be flown from the blowout openings 22a to the position around the original reading position A along the profile of the guide member 33 without disturbances. This is advantageous for prevention of flutters that tend to occur especially when the trailing edge of the original is read.

An original D having low rigidity is conveyed along with the airflow flowing between the original D and the guide member 33 and thereby does not contact the guide member 33 at the position around the original reading position A. Therefore, paper dust originated out of the original D and contaminants carried by the original D can be prevented from attaching to the guide member 33.

Since the convex portion 33b is located at the position upstream from the original reading position A, a rigid original D or a original D with wrinkles, creases, etc., does not contact the guide member 33 at the position around the original reading position A. Therefore, contaminants attached to the original D can be prevented from attaching to the guide member 33.

The airflow uniformly flows from the blowout openings 22a to the position around the original reading position A along the profile of the guide member 33 without disturbances. Therefore, if dust such as dirt and grit originated out of the original D during the conveyed original D is passing through the guide member 33 and reaches the portion of the guide member 33 around the original reading position A, the dust does not attach to the guide member 33 but blown off. The dust blown off is discharged from the convey pass 34 via a dust outlet 34a provided between the convey roller pairs 17c and 18 on the convey pass 34, and collected in a dust sink 34b.

A white reference plate 32 as a white reference member is disposed around the vertex of the convex portion 33b. The image sensor 31 is configured to be movable through a moving mechanism (not shown) in order to move to a position opposite to the white reference plate 32 and to read the white reference plate 32 in acquisition of shading correction data. The shading correction data are acquired for correcting the sensitivity variation among optoelectronic conversion elements of the image sensor 31 and the unevenness of the illumination light, optical system, and so on.

Before the original D is fed, the image sensor 31 is moved to a position where reflected light from the white reference plate 32 can be received. A light source included in the image sensor 31 emits light on the back (a white reference surface) of the white reference plate 32 through the transparent convex portion 33b. The image sensor 31 reads the reflected light from the white reference plate 32. In reading images of the original, the image sensor 31 is moved to a position where reflected light from the original D can be received. The light source included in the image sensor 31 emits light on the fed original D through the transparent flat portion 33a. The image sensor 31 receives the reflected light from the fed original D (FIG. 4). The original reading position A, which is the focal position on the light path for the image sensor 31 to read the image of the original D, can set to be disposed on the light path between the surface of the flat portion 33a and the surface of the platen roller 21 at a position closer to the platen roller 21 than the middle point therebetween.

In this manner, by providing the white reference plate 32 around the vertex of the convex portion 33b, the optical length of light path at the time when the image sensor 31 reads the original D can be made closer to the optical length of light path at the time when the image sensor 31 reads the white reference plate 32. Since the white reference plate 32 can be disposed at a position where the optical light path length is substantially the same as the optical light path length of the reading position of the original D. Therefore, compared with conventional apparatus which is affected by dimensional tolerances of parts and attachment errors of parts, acquisition of highly accurate shading correction data is possible.

In addition, since the white reference plate 32 read in acquisition of the shading correction data is disposed near the original reading position A to make the moving mechanism small, the image reading apparatus can be downsized.

The white reference plate 32 may not be exposed on the vertex of the convex portion 33b but may be buried in the guide member 33.

The white reference plate 32 may be provided on a side of the guide member 33 that faces the image sensor 31. In this case, the guide member 33 around the white reference plate 32 need not be transparent.

As described above, according to the present embodiment, it is possible to prevent contaminants from attaching the guide member 33 around the original reading position A without being affected by the rigidity or wrinkles, creases, etc., of the original D, and it is possible to prevent flutters of the leading and trailing edges of the original D caused by the airflow. Thus, a high quality image can be read from the leading edge to the trailing edge of the original D with few occurrences of streaks.

Figure 5:
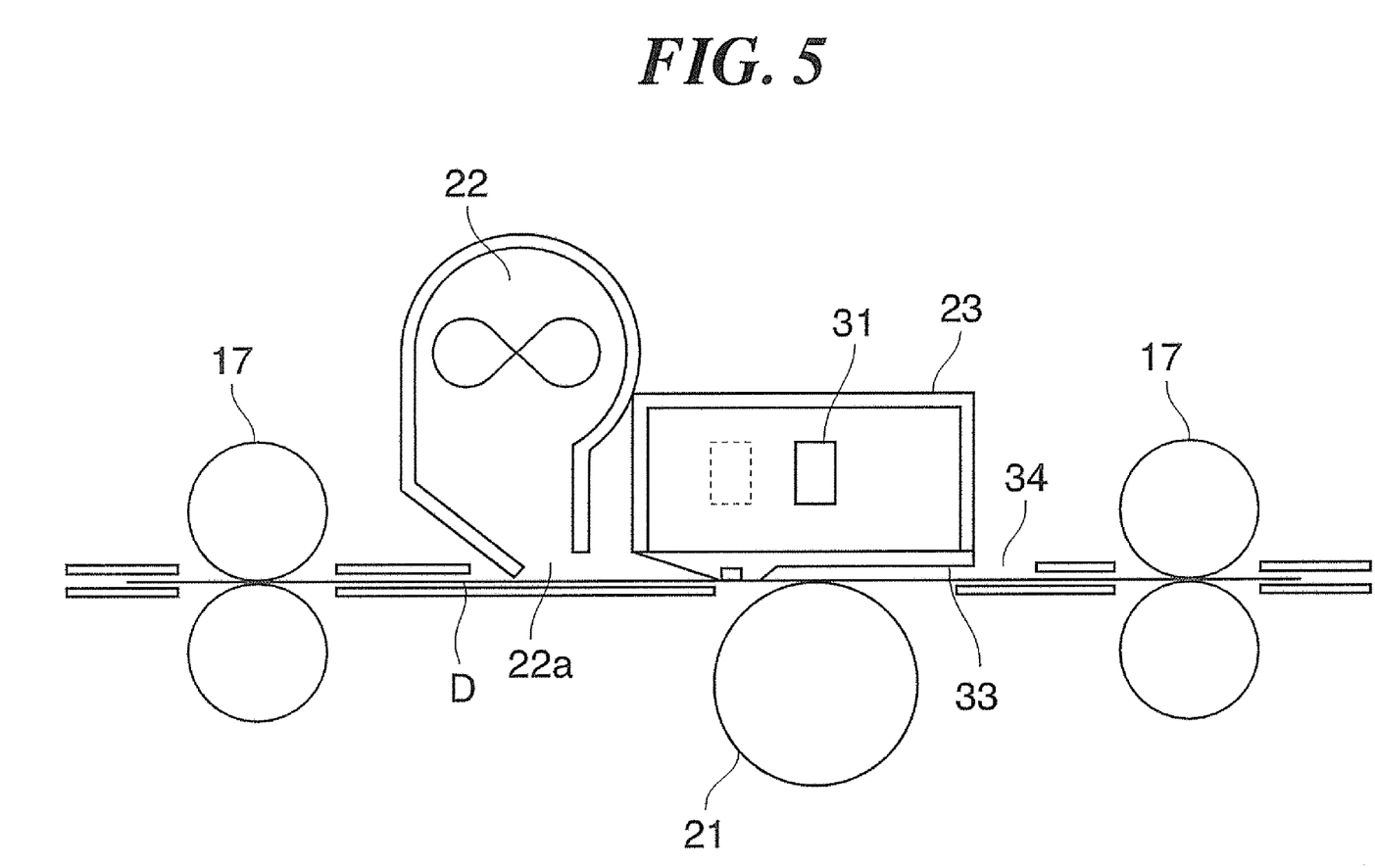
FIG. 5 is a sectional view around the scanning assembly in the image reading apparatus according to a second embodiment of the present invention.

Now, with reference to FIG. 5, an image reading apparatus according to a second embodiment of the present invention will be described. Elements identical or equivalent to those in the above first embodiment are designated by identical reference numerals and description thereof is omitted.

In the above first embodiment, the airflow generator 22 is integrally provided in the scanning assembly 23. In the second embodiment, as shown in FIG. 5, an image reading apparatus is configured such that the airflow generator 22 is separately provided upstream from the scanning assembly 23. Other configurations and advantageous effects are the same as the above first embodiment.

Figure 6:
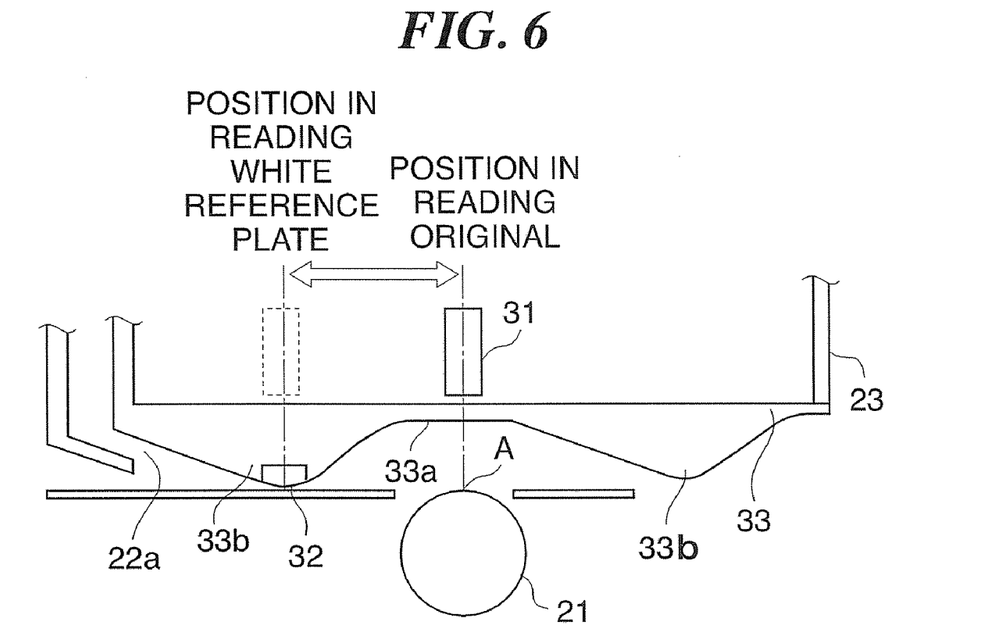
FIG. 6 is an enlarged sectional view around the guide member in the image reading apparatus according to a third embodiment of the present invention.

Now, with reference to FIG. 6, an image reading apparatus according to a third embodiment of the present invention will be described. Elements identical or equivalent to those in the above first embodiment are designated by identical reference numerals and description thereof is omitted.

The above first embodiment has illustrated the case where the guide member 33 has the convex portion 33b disposed only upstream from the flat portion 33a. In the third embodiment, as shown in FIG. 6, the image reading apparatus is configured such that convex portions 33b are disposed both upstream and downstream from the flat portion 33a, respectively. Although in this embodiment two convex portions 33b are disposed, three or more convex portions 33b are allowed to dispose.

This makes it harder for the conveyed original D to contact the portion of the guide member 33 around the original reading position A, thereby providing an increase in the effect of preventing dust attachment. Other configurations and advantageous effects are the same as the above first embodiment.

Figure 7:
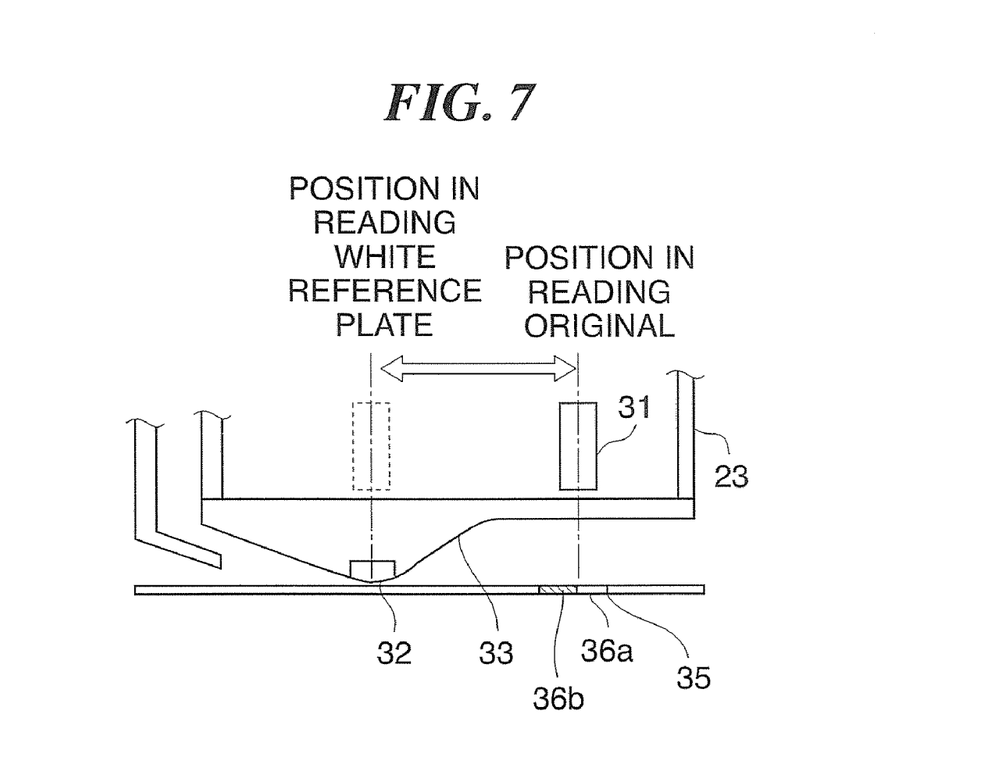
FIG. 7 is an enlarged sectional view around the guide member in the image reading apparatus according to a fourth embodiment of the present invention.

Now, with reference to FIG. 7, an image reading apparatus according to a fourth embodiment of the present invention will be described. Elements identical or equivalent to those in the above first embodiment are given like symbols in FIG. 7 and will not be described.

The above first embodiment has illustrated the case where the platen roller 21 is disposed opposite to the image sensor 31 across the convey pass 34. In the fourth embodiment, as shown in FIG. 7, the image reading apparatus is configured such that an substantially planar convey guide 35 is disposed opposite to the image sensor 31 across the convey pass 34. This convey guide 35 is provided with background members 36a and 36b of different colors (e.g., white and black) to be read together with the original D to form the background image of the read image.

In this case, the background member 36a (or 36b) with a desired color can be disposed opposite to the image sensor 31. This may be done by moving the image sensor 31 to a position opposite to the background member 36a (or 36b) of the desired color through a moving mechanism (not shown), or by moving the convey guide 35 relative to the image sensor 31 in the conveying direction of the original D through a moving mechanism (not shown). Other configurations and advantageous effects are the same as the above first embodiment.

Figure 8:
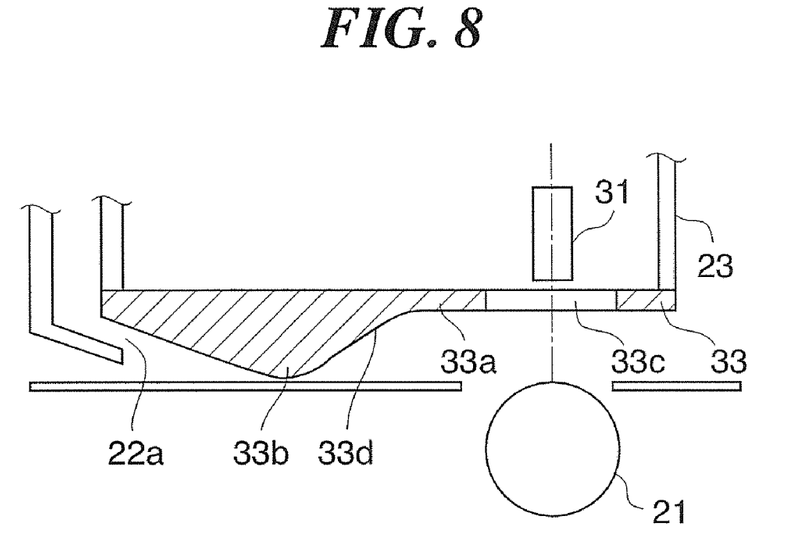
FIG. 8 is an enlarged sectional view around the guide member in the image reading apparatus according to a fifth embodiment of the present invention.

Now, with reference to FIG. 8, an image reading apparatus according to a fifth embodiment of the present invention will be described. Elements identical or equivalent to those in the above first embodiment are designated by identical reference numerals and description thereof is omitted.

In the above first embodiment, the entire guide member 33 is formed of a transparent resin or glass. However, in the image reading apparatus in the fifth embodiment, as shown in FIG. 8, only a portion of the guide member 33 is formed of a transparent member 33c. This portion is where the illuminating light from the light source in the image sensor 31 illuminating the original D and the reflected light from the original D are transmitted through when the image sensor 31 reads the image of the original D. Other portions of the guide member 33 are configured with a nontransparent member 33d.

Thus, the transparent member 33c can be of a simple shape, so that a glass plate or the like can be used as the transparent member 33c. This allows improvement in the surface accuracy of a transparent portion in the transparent member 33c.

Now, with reference to FIG. 9, the image reading apparatus as a sixth embodiment of the present invention will be described. Elements identical or equivalent to those in the above first embodiment are designated by identical reference numerals and description thereof is omitted.

In the above first embodiment, the white reference plate 32 is disposed as exposed around the vertex of the convex portion 33b. In the sixth embodiment, a white reference plate is provided between a flat plate member 93a and a convex member 93b. Other configurations and advantageous effects are the same as the above first embodiment.

In the image reading apparatus according to the sixth embodiment. As shown in FIG. 9, a guide member 93 guiding the original D conveyed on the convey pass 34 is disposed on the side of the scanning assembly 23 that faces the convey pass 34. The guide member 93 has the flat plate member 93a disposed at a downstream portion of the image scanning assembly 23 with respect to the convey pass, the convex member 93b disposed at an upstream portion of the image scanning assembly 23 with respect to the convey pass, and the white reference plate 92 sandwiched between the flat plate member 93a and the convex member 93b orthogonally with respect to the direction of illumination light emitted from the image sensor 31.

The flat plate member 93a is disposed at a downstream portion in the conveying direction around the original reading position A, which is the focal position on the light path for the image sensor 31 to read the original D. The flat plate member 93a is disposed so that the surface of the flat plate member 93a is substantially in parallel with the convey pass 34. The flat plate member 93a is a transparent member formed of, for example, a transparent resin or glass.

The convex member 93b has a convex portion 94 protruding toward the convey pass 34, and a stepped portion 95 provided at a junction with the flat plate member 93a. The protrusion of the convex portion 94 is designed to have a height so that a tangent line of the platen roller 21 parallel with the convey pass 34 is substantially identical to a tangent line of the protruding vertex of the convex portion 94. The convex member 93b may be a transparent member formed of, for example, a transparent resin. However, the convex member 93b may be a nontransparent member.

The white reference plate 92 is attached to the surface of the flat plate member 93a and/or to the stepped portion 95 of the convex member 93b so that one side (a white reference surface) closely contacts the flat plate member 93a. The white reference plate is not limited to a plate member, but may be a white colored coating formed on one side of the flat plate member 93a by painting, coating, or the like. The flat plate member 93a and the convex member 93b may be integrally formed, and the white reference plate 92 may be buried in the guide member 93. The white colored coating formed on the stepped portion 95 of the convex member 93b is also adoptable. However, the white colored coating formed on the convex member 93b is preferable because its close contact. The white reference plate or the white colored coating may be omitted if the convex member 93b is formed of a white colored material.

According to this embodiment, the white reference plate 92 closely contacts the plate member 93a or buried in the guide member 93. This can ensure preventing contaminants from attaching to the white reference surface illuminated and read in acquisition of the shading correction data.

The present invention is not limited to the embodiments described above, but various changes and modifications may be made without departing from the scope of the appended claims.

For example, while the above embodiments have been described by taking an original reading apparatus as an example, this is not a limitation. Rather, the present invention may be applied to apparatuses with a mechanism of sequentially feeding and reading a plurality of originals, such as a copier and the like.

The above embodiments have been illustrated for the case where the blowout openings 22a of the airflow generator 22 are disposed upstream from the convex portion 33b (94) of the guide member 33 (93). Instead of this, the blowout openings 22a may be disposed between the convex portion 33b (94) of the guide member 33 (93) and the original reading position A.

According to this configuration, the blowout openings 22a can be closer to the original reading position A. This allows stronger airflow to reach the portion around the original reading position A.

Thus, the ability to prevent contaminants from attaching around the original reading position A can be increased. In addition, downsizing of the apparatus can be achieved because the distance between the scanning assembly 23 and the airflow generator 22 can be reduced.

In the above embodiments, an elastic member extending in the direction of the axis of the platen roller 21 may be fixed on the platen roller 21 to protrude from the peripheral surface of the platen roller 21. Rotation of the platen roller 21 can cause the elastic member to contact the flat portion or flat plate member of the guide member to thereby clean the flat portion or the flat plate member. In this case, a rubber material or a coated rubber material, as well as a brush, cloth, or the like may be used as the elastic member.

While the present invention has been described with reference to exemplary embodiments, it is to be understood that the invention is not limited to the disclosed exemplary embodiments. The scope of the following claims is to be accorded the broadest interpretation so as to encompass all modifications, equivalent structures and functions.

This application claims the benefit of Japanese Application No. 2007-141702, filed May 29, 2007, which is hereby incorporated by reference herein in its entirety.

What is claimed is:

1. An image reading apparatus that conveys an original along a convey pass and reads an image of the original being conveyed, comprising:
    a guide member adapted to guide the original being conveyed, at least part of said guide member being transparent;
    an image reading unit adapted to read an image of the original being conveyed through said guide member; and
    an airflow generating unit adapted to generate airflow blown into the convey pass from a location upstream in a conveying direction compared to a location of said image reading unit,
    wherein said guide member has a convex portion disposed at a location upstream in the conveying direction compared to the location of said image reading unit, and
    wherein said guide member has a plurality of said convex portions arranged along the conveying direction, and a flat portion located between one of said convex portions and another one of said convex portions and substantially parallel with the convey pass, and said image reading unit reads the image of the original with light transmitted through said flat portion.

2. An image reading apparatus as claimed in claim 1, wherein said guide member has a flat portion substantially parallel with the convey pass at a location downstream in the conveying direction compared to a location of said convex portion, and said image reading unit reads the image of the original with light transmitted through said flat portion.

3. An image reading apparatus as claimed in claim 1, comprising a plurality of said image reading units and a plurality of said airflow generating units to be able to read images of front side and back side of the original.

4. An image reading apparatus as claimed in claim 1, wherein said guide member is provided with a blowout opening for the airflow generated by said airflow generating unit.

5. An image reading apparatus as claimed in claim 1, wherein said flat portion is a transparent member through which illuminating light emitted on the original and reflected light from the original are transmitted, and said convex portion is a member formed of a material different from a material of said transparent member.

6. An image reading apparatus that conveys an original along a convey pass and reads an image of the original being conveyed, comprising:
    a guide member adapted to guide the original being conveyed, at least part of said guide member being transparent;
    an image reading unit adapted to read an image of the original being conveyed through said guide member; and
    an airflow generating unit adapted to generate airflow blown into the convey pass from a location upstream in a conveying direction compared to a location of said image reading unit,
    wherein said guide member has a convex portion disposed at a location upstream in the conveying direction compared to the location of said image reading unit, and
    wherein a white reference member for use in acquisition of shading correction data is disposed around the most protruding portion of said convex portion.

7. An image reading apparatus as claimed claim 6, wherein said guide member has a flat portion substantially parallel with the convey pass at a location downstream in the conveying direction compared to a location of said convex portion, and said image reading unit reads the image of the original with light transmitted through said flat portion.

8. An image reading apparatus as claimed in claim 6, comprising a plurality of said image reading units and a plurality of said airflow generating units to be able to read images of front side and back side of the original.

9. An image reading apparatus as claimed in claim 6, wherein said guide member is provided with a blowout opening for the airflow generated by said airflow generating unit.

10. An image reading apparatus as claimed in claim 6, wherein said flat portion is a transparent member through which illuminating light emitted on the original and reflected light from the original are transmitted, and said convex portion is a member formed of a material different from a material of said transparent member.

11. An image reading apparatus that conveys an original along a convey pass and reads an image of the original being conveyed, comprising:
    a guide member adapted to guide the original being conveyed, at least part of said guide member being transparent;
    an image reading unit adapted to read an image of the original being conveyed through said guide member; and
    an airflow generating unit adapted to generate airflow blown into the convey pass from a location upstream in a conveying direction compared to a location of said image reading unit,
    wherein said guide member has a convex portion disposed at a location upstream in the conveying direction compared to the location of said image reading unit, and
    wherein said guide member has a flat plate member disposed at a downstream portion in the conveying direction of said guide member, a convex member disposed at an upstream portion in the conveying direction of said guide member, and a white reference member sandwiched between said flat plate member and said convex member.

12. An image reading apparatus as claimed in claim 11, wherein said flat plate member is formed of a material selected from a group consisting of glass and a transparent resin, and said convex member is formed of a resin.

13. An image reading apparatus as claimed in claim 11, wherein said white reference member is a white-colored coating formed by painting and/or coating on said flat plate member and/or said convex member.

14. An image reading apparatus as claimed claim 11, wherein said guide member has a flat portion substantially parallel with the convey pass at a location downstream in the conveying direction compared to a location of said convex portion, and said image reading unit reads the image of the original with light transmitted through said flat portion.

15. An image reading apparatus as claimed in claim 11, comprising a plurality of said image reading units and a plurality of said airflow generating units to be able to read images of front side and back side of the original.

16. An image reading apparatus as claimed in claim 11, wherein said guide member is provided with a blowout opening for the airflow generated by said airflow generating unit.

17. An image reading apparatus as claimed in claim 11, wherein said flat portion is a transparent member through which illuminating light emitted on the original and reflected light from the original are transmitted, and said convex portion is a member formed of a material different from a material of said transparent member.

* * * * *